(No Model.) 3 Sheets—Sheet 1.
E. STOWELL.
FIELD OF VIEW DIVIDER SHUTTER.

No. 536,105. Patented Mar. 19, 1895.

Witnesses
Eusebius A. Kellogg
B. P. Barker.

Inventor
EDWIN STOWELL
By Thomas H. Holday
Attorney (No Model.) 3 Sheets—Sheet 2.

E. STOWELL.
FIELD OF VIEW DIVIDER SHUTTER.

No. 536,105. Patented Mar. 19, 1895.

Witnesses
Eusebius A. Kellogg
Jas. H. Cline

Inventor
Edwin Stowell.
By Thomas H. Hobday
Attorney (No Model.) 3 Sheets—Sheet 3.
E. STOWELL.
FIELD OF VIEW DIVIDER SHUTTER.

No. 536,105. Patented Mar. 19, 1895.

Witnesses

Inventor
Edwin Stowell
By Thomas W. Hobday
Attorney

UNITED STATES PATENT OFFICE.

EDWIN STOWELL, OF FAIRHAVEN, MASSACHUSETTS.

FIELD-OF-VIEW-DIVIDER SHUTTER.

SPECIFICATION forming part of Letters Patent No. 536,105, dated March 19, 1895.

Application filed February 26, 1894. Serial No. 501,597. (No model.)

*To all whom it may concern:*

Be it known that I, EDWIN STOWELL, of Fairhaven, in the county of Bristol, State of Massachusetts, have invented a Camera Field-of-View Divider, of which the following is a specification.

This invention consists in a mechanism designed to divide the field of view of a camera objective into two or more parts, and further consists in such mechanism being designed to register or indicate the respective parts making complete the picture desired to be produced on the film or dry plate, and further consists in this mechanism being designed to permit the operator to subject the dry plate to either of the parts or to the whole view at once, as he may desire, in order to effect the desired picture, and to repeat the operation on other dry plates, to obtain the same view.

The object is to produce a photograph showing one complete unbroken view of a landscape or other immovable, natural or otherwise view, containing a picture or representation of a movable thing (*i. e.*, the same thing) animate or inanimate, in two or more attitudes, positions, and appearances, or as the operator may desire within the natural scene or view, within the field of view of the camera lens.

The accompanying drawings illustrate the nature of my invention, of which—

Figure 1:
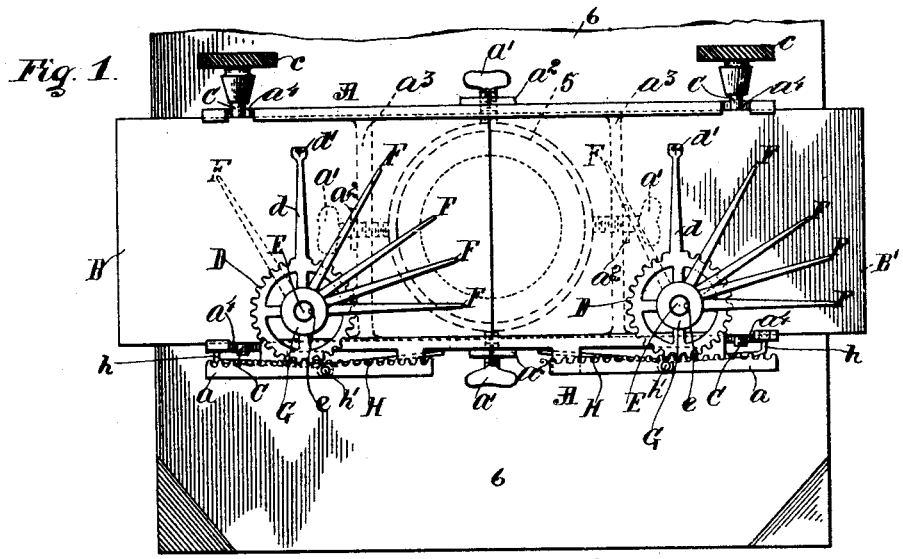
Figure 2:
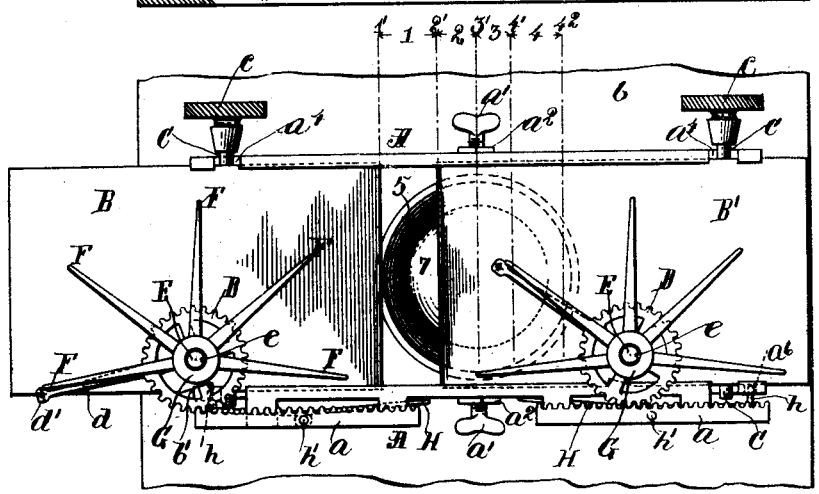
Figure 3:
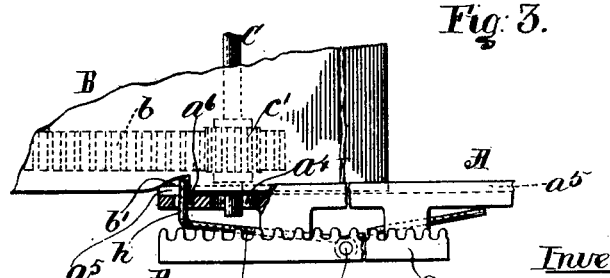
Figure 4:
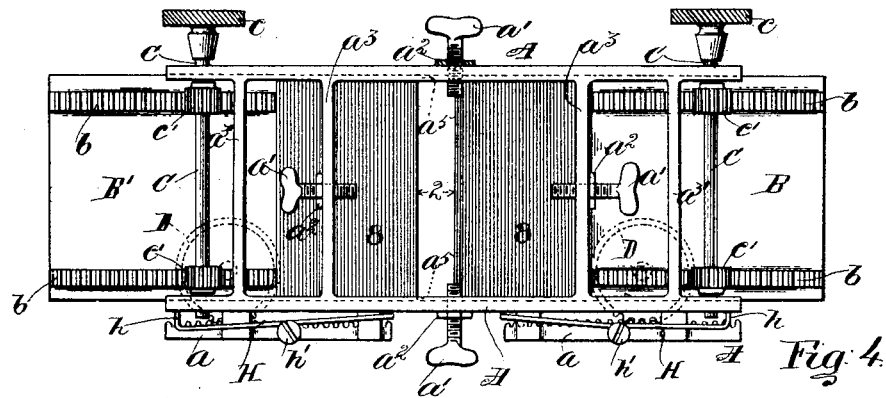
Figure 5:
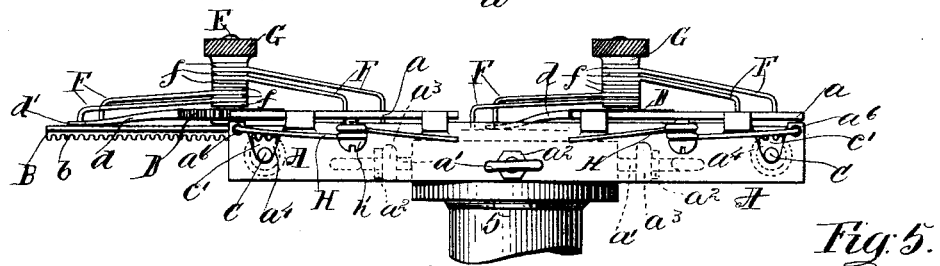
Figure 6:
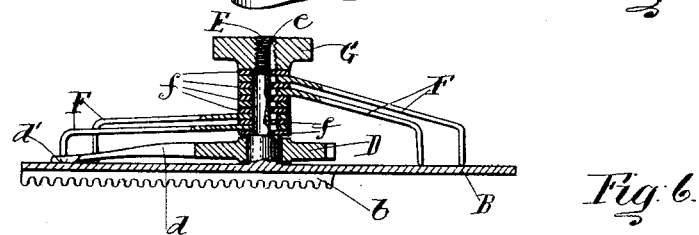
Figure 7:
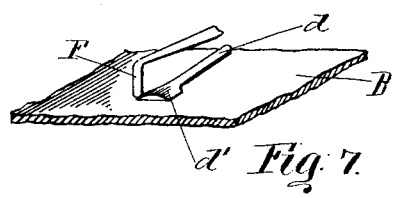
Figure 8:
Figure 9:
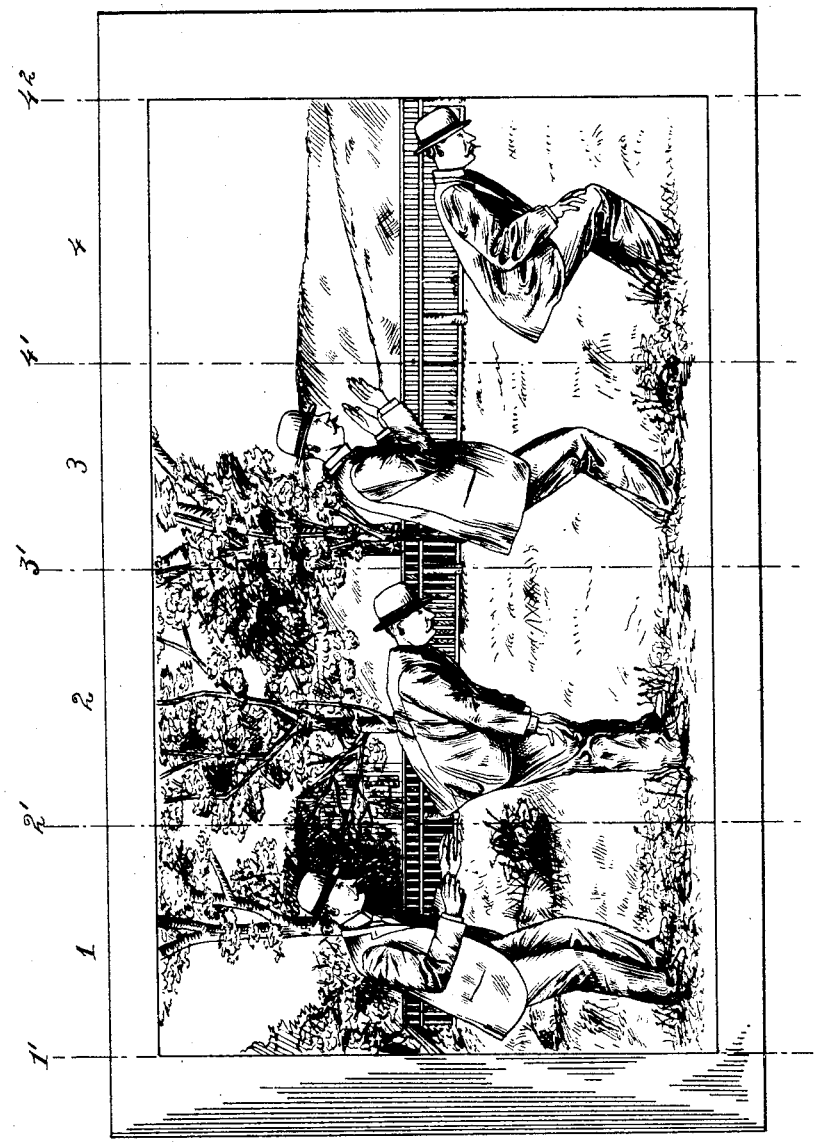

Figure 1 is a front view of my shutter represented to be applied to a camera for use. Fig. 2 is a view similar to Fig. 1, but showing a different position of parts, of my shutter. Fig. 3 is a detail view of my invention showing my shutter stop means, fully described hereinafter. Fig. 4 is a back view of my shutter. Fig. 5 is an under side view of my shutter, represented, applied for use to the lens tube. Fig. 6 is a sectional side view of the shutter, and Fig. 7 is a detail view of enlarged scale illustrating the respective ends of the stops and indicating finger. Fig. 8 is a plan view of one of the washers, and Fig. 9 represents a photograph produced by my invention, embracing the essential object.

Referring now in detail to the accompanying drawings by the letters and numerals marked thereon, (6) represents the frame of the camera; (5), the lens tube; (7), the lens within the tube, and (A) the framework of my shutter.

The framework (A) consists of the opposite guideway portions ($a^5$), and the guideway connecting portions ($a^3$) and ($a^{3\prime}$), and the racks ($a$) provided on the bottom guideway, and said framework is provided with threaded holes to receive the thumb screws ($a'$) as shown, and with the notch bearings ($a^4$) and the holes ($a^6$).

(B) and (B$'$) represent parts, which I term shutters as they are the means by which I effect a portional view of the whole view within the range of the camera objective. These shutters are provided with the racks ($b$), a darkened or black surface represented by the cross lining or numeral (8), and with the outstanding or projecting studs (E), and are designed to engage the frame guideways as illustrated by the drawings, and are further provided with the notches ($b'$).

The wheels (D) are designed to turn on the studs (E) and to engage the frame racks as illustrated by the drawings, and are each provided with indicating fingers ($d$) for the purpose which will presently appear.

That part of the stud (E) which carries the indicating wheel (D), is in greater diameter than the remaining portion, so as to produce a shoulder or seat for the bottom washer ($f$) placed on the reduced portion of said stud as shown, and such difference in diameters is further designed to prevent the washers and arms (F) from coming in contact with the wheel (D), and preventing its turning freely. The end of the indicating finger ($d$) is designed as represented by the letter ($d'$) for the purpose which will presently appear.

The washers ($f$) are provided with the inner projecting portions ($f'$) as clearly shown by Fig. 8. These portions ($f'$) of the washers fit into the groove ($e$) running lengthwise of the reduced portion of the stud (E), for the purpose of preventing such washers turning on the stud.

The before mentioned arms (F), more properly speaking stops, because they act as such as will presently appear,—are placed upon their respective studs (E) in the manner clearly represented by Fig. 6., namely: The stops are loosely placed on the studs, having a washer between each two for the purpose of preventing the movement of one stop creating a tendency to move another. In other words the washers and stops are placed on the studs alternately, and are forced against each other by the thumb nut (G) in threaded engagement with the free end of the stud (E) as illustrated, for the purpose of creating sufficient friction, to retain the stops where placed by the manipulator, and to prevent the indicating finger moving the stops, when moved to pass under the stops for the reason which will presently appear. The lengths of these stops are about equal to the length of the indicating fingers as is clearly shown by Fig. 6., and the stops are designed to yield outward from the face of the shutters upon the end of the indicating finger being forced against the end of said stops, to permit said finger to move to the next stop for the purpose which will also presently appear. The end of the indicating finger is designed as previously mentioned, so as to pass the stops more easily than would be attained if designed with edges.

Figs. 1., and 2., show my stops in different positions, representing that such can be placed wherever the operator may choose, in order to effect a record of the width of the part of the whole view within the range of said objective, to enable the operator to repeat the previous operation with exactness and precision, which is represented by Fig. 2., the indicating fingers contacting their respective stops equal to the width of space between the inner ends of the shutters.

The springs H are retained on the framework by the screws ($h'$) below the under surface of the bottom guideway and are designed to engage with the under surface of their respective shutters, to effect a stop means therefor to prevent such shutters being drawn out of engagement with the framework through inadvertence. The outward ends of these springs are designed to pass through the holes ($a^6$) in order to engage with the shutters as before mentioned, and the shutters are provided with the recesses ($b'$) as shown to produce the wall as shown, for the upturned end ($h$) of the spring to engage, and thus effect a controllable limit of the movement of the shutters, i. e., a means capable of preventing the shutters becoming disengaged from their guideways through negligence.

(C) represents my shutter actuating means, which consists of the vertical shaft (C) provided with the pinions or wheels ($c'$) and manipulating knob ($c$). These shafts, (there being two, one for each shutter) are fitted in the notch bearings on the framework as illustrated, and their pinions engage with the respective racks on the shutters, thus transmitting the motion imparted to the shafts by the operator, to the shutters in such a manner, toward or from the center, as the operator may desire.

My field of view dividing mechanism, is retained on the lens tube by the thumb screws ($a'$) engaging the lens tube as shown. These screws are provided with the nuts ($a^2$) to lock said screws after being made to bear against the lens tube. Further, my mechanism is or may be designed so as to fit and be secured or retained on any lens tube, in front of objective; and this feature of adaptability I attain by the use of the aforesaid thumb-screws.

The spaces marked or represented by the numerals 1., 2., 3., and 4., in Fig. 2., represent the spaces so marked on Fig. 9., made by the divisional lines $1'.$, $2'.$, $3'.$, $4'.$, and $4^2.$, on both the just mentioned views, and these spaces represent that Fig. 9., (representing a photograph) was effected or taken in four independent operations or parts upon the same dry plate or film, producing a photograph showing one and the same individual in four different positions, &c., within one natural scene within the field of view of the camera lens.

Fig. 2., shows the shutters in position to take the first part of the picture Fig. 9., marked (1), as with the space between the inner ends of the shutters in said Fig. 2., which also shows that the indicating finger contacts, on the right hand shutter, with the second stop, while the other finger on the opposite shutter is in contact with the first stop, thus creating the first space (1).

It can be readily seen, that by positioning the stops as shown by Fig. 2., equal to the spaces desired by the operator, marked 1., 2., 3., and 4., the shutters will permit the camera lens to take only such view as determined by the space between the inner ends of the shutters. Thus by manipulating my attachment or invention according to the position of the stops in the aforesaid view, one individual can be taken within the same scenery four times as represented by said Fig. 9.

Fig. 1., shows the same number of stops as shown in Fig. 2., dividing one half of the whole view within the field of view of the camera lens, into four equal parts, which is to represent that my invention can have applied any convenient number of stops to take the same object in any number of positions, &c., within the same scenery.

I wish to mention that a picture taken through my "field of view dividing mechanism" will appear as other photographs, that is to say, as if the whole were simultaneously taken.

Having described my invention, I claim—

1. A camera field of view divider, consisting of a framework having means to make detachably retainable the framework on the lens tube of a camera, and a guideway to operatively retain field of view divider shutters, and designed to efficiently retain field of view divider shutter operating means, of suitable field of view divider shutters adapted to be moved, oppositely and movably fitted in the framework guideways, of means in reciprocal engagement with the shutters and framework to move the shutters, substantially as and for the purpose described.

2. A camera field of view divider, consisting of a framework having means to make detachably retainable the framework on the lens tube, of a camera, and having a guideway to operatively retain field of view divider shutters, and designed to efficiently retain field of view divider shutter operating and indicating means, of two suitable field of view divider shutters adapted to be moved, oppositely and movably fitted in the framework guideways, of means in reciprocal engagement with the shutters and framework to respectively move the shutters and to indicate the movement of the shutters, substantially as and for the purpose described.

3. A camera field of view divider, consisting of a framework having means to make retainable the framework on the lens tube of a camera, and a guideway to operatively retain field of view divider shutters, and designed to efficiently retain field of view divider shutter operating means, and having racks to effect an efficient field of view divider shutter indicating means, of suitable field of view divider shutters adapted to be moved, oppositely and movably fitted in the framework guideways, of means in reciprocal engagement with the field of view divider shutter and the framework to move the shutters, and of means to indicate the movement of the field of view divider shutter consisting of a wheel being axially retained on the shutter and in mesh with the framework rack, and having an indicating finger, of movable shutter indicating stops arranged to intersect the path of the indicating finger and adapted to resistibly give way to the movement of the indicating wheel finger, substantially as and for the purpose described.

4. The combination of a framework adapted to be retained on the lens tube of a camera, and having a field of view divider shutter guideway, and designed to efficiently retain field of view divider shutter operating means and having racks to effect an efficient field of view divider-shutter indicating means, of two suitable field of view divider-shutters, oppositely and movably fitted in the framework guideways and having racks, of vertical shafts operatively retained by the framework and having pinions in mesh with the field of view divider-shutter racks, and provided with suitable manipulating means, of means to indicate the movement of the field of view divider-shutters consisting of a wheel being axially retained on the shutters and in mesh with the framework racks and having an indicating finger, of independently movable field of view divider-shutter indicating stops arranged on the shutters to intersect the path of the indicating finger and adapted to resistibly give way to the movement of the indicating wheel finger, substantially as and for the purpose described.

5. The combination with a camera, of a field of view divider shutter mechanism, consisting of a framework having a field of view divider-shutter guideway, and designed to efficiently retain field of view divider-shutter operating means, and having means to effect a recordation of the movement of the field of view divider-shutter, of two suitable field of view divider-shutters, adapted to be moved, oppositely, and movably fitted in the framework guideways, of efficient means in reciprocal engagement with the shutters and framework to respectively move the shutters and to indicate the movement of the shutters, substantially as, and for the purpose described.

6. The combination with a camera, of a field of view divider shutter mechanism, consisting of a framework having means to make retainable the framework on the lens tube, and designed to efficiently retain field of view divider-shutter, operating means, and having a field of view divider-shutter guideway and racks to effect an efficient field of view divider-shutter indicating means and provided with means to limit the outward movement of the field of view divider-shutters, of two suitable field of view divider-shutters, such having their surfaces blackened, and being oppositely, and movably fitted in the framework guideways and having racks, of vertical shutter operating shafts, operatively retained by the framework, and having pinions in mesh with the field of view divider-shutter racks, and provided with manipulating means, of means to indicate the movement of the field of view divider-shutters consisting of a wheel being axially retained on the shutters and in mesh with the framework racks and having an indicating finger, of independently movable field of view divider-shutter indicating stops, arranged on the shutters to intersect the path of the indicating finger and adapted to resistibly give way to the movement of the indicating wheel finger, and of means to make adjustable the tension on the stops to prevent them moving of their own accord from where positioned, substantially as and for the purpose described.

7. In the heretofore described field of view divider-shutter, the framework having the shutter guideway, the operating shaft's bearings the openings ($a^6$) the racks ($a$), and adapted to receive in threaded engagement the set screws ($a'$), the set screws engaging the framework as described and the lock nuts provided thereon, the spring (H) adapted to enter the hole ($a^6$) and to contact the field of view divider-shutter, and the spring retaining screw ($h'$), all substantially as described, in combination with two field of view divider-shutters, such having blackened surfaces and being movably fitted in the framework guideways and provided with the recess or notch ($b'$) and having the racks ($b$) and the stud (E) provided thereon, the vertical shutter operating shafts, operatively retained by the framework, and having the pinions ($c'$) in mesh with the shutter racks and provided with the manipulating means (c), the indicating wheel (D), the indicating finger (d) provided thereon, and the indicating wheel axially retained on the shutter stud (E) and in mesh with the framework rack, the stops (F), such axially retained on the shutter stud and designed to intersect the path of the indicating finger and adapted to resistibly give way to the movement of the indicating finger, the washers (f), such having the projection (f') to engage the groove in the shutter stud and being between the indicating wheel and the stops alternatively, and the thumb nut (G) designed to engage the threaded portion of the shutter stud, as and for the purpose described.

8. In the heretofore described field of view divider-shutter, the framework having the shutter guideways, the operating shaft's bearings, the openings ($a^6$), the racks (a), and adapted to be detachably retained on the lens tube of a camera, and means provided thereon to limit the outward movement of the shutters, the two field of view divider-shutters, such having blackened surfaces and being movably fitted in the framework guideways and provided with the recess or notch (b') and having the racks (b) and the stud (E) provided thereon, substantially as described, in combination with the vertical shutter operating shafts, operatively retained by the framework and having the pinions (c') in mesh with the shutter racks and provided with the manipulating means (c), the indicating wheel (D), the indicating finger (d) provided thereon, and the indicating wheel axially retained on the shutter stud (E) and in mesh with the framework rack, the stops (F), such axially retained on the shutter stud and designed to intersect the path of the indicating finger and adapted to resistibly give way to the movement of the indicating finger, the washers (f), such having the projection (f') to engage the groove in the shutter stud and being between the indicating wheel and the stops alternatively, and the thumb nut (G) designed to engage the threaded portion of the shutter stud, substantially as, and for the purpose described.

In testimony whereof I have signed my name to this specification in presence of two subscribing witnesses.

EDWIN STOWELL.

Witnesses:
EUSEBIUS A. KELLOGG,
THOMAS W. HOBDAY.